United States Patent [19]

Hall

[11] Patent Number: 5,009,457
[45] Date of Patent: Apr. 23, 1991

[54] LOAD BEARING COVER AND RACK FOR A PICK-UP TRUCK

[76] Inventor: David E. Hall, 2085 S. Sylvan, West Linn, Oreg. 97068

[21] Appl. No.: 465,762

[22] Filed: Jan. 16, 1990

[51] Int. Cl.$^5$ ............................ B60P 3/00; B60P 7/00
[52] U.S. Cl. ........................................ 296/3; 296/100; 224/42.01
[58] Field of Search ................ 296/3, 100; 224/273, 224/321, 42.01, 42.43, 42.44

[56] References Cited

U.S. PATENT DOCUMENTS

| | | | |
|---|---|---|---|
| 855,721 | 6/1907 | Moore et al. | 296/3 |
| 2,043,858 | 6/1936 | Moore | 296/100 |
| 2,909,387 | 10/1959 | Burtzloff | 296/100 X |
| 2,997,330 | 8/1961 | Boultinghouse | 296/3 |
| 3,069,199 | 9/1954 | Reardon et al. | 296/100 |
| 3,514,152 | 5/1970 | Hermon | 296/100 |
| 3,594,035 | 7/1971 | Ferguson | 296/3 |
| 3,858,744 | 1/1975 | Garvert | 296/100 X |
| 4,138,046 | 2/1979 | De Freze | 296/3 X |
| 4,223,941 | 9/1980 | Janzen et al. | 296/100 |
| 4,531,775 | 7/1985 | Beals | 296/100 |
| 4,600,232 | 7/1986 | Phillips | 296/3 |
| 4,695,087 | 9/1987 | Hollrock | 296/100 X |
| 4,824,157 | 4/1989 | Nielsen et al. | 296/3 X |
| 4,832,394 | 5/1989 | Macomber | 296/100 |

FOREIGN PATENT DOCUMENTS 69324  6/1978  Japan ..................... 296/100

Primary Examiner—Margaret A. Focarino
Assistant Examiner—Andrew C. Pike
Attorney, Agent, or Firm—Klarquist, Sparkman, Campbell, Leigh & Whinston

[57] ABSTRACT

This invention relates to a cover for the bed of a pick-up truck or utility trailer which, in the closed position, can be locked to the bed of the vehicle to provide secure storage of items in the bed but which also may be raised to a vertical position to extend the height of the side walls of the bed to assist in carrying oversize or bulky items. A pair of load support members lie beneath the cover when the cover is in the closed position to increase the load carrying capacity of the covers. The load supports are removable and are positioned between the vertical cover panels when the cover is in a vertical position to convert the cover into a load carrying rack capable of transporting elongated material.

10 Claims, 2 Drawing Sheets

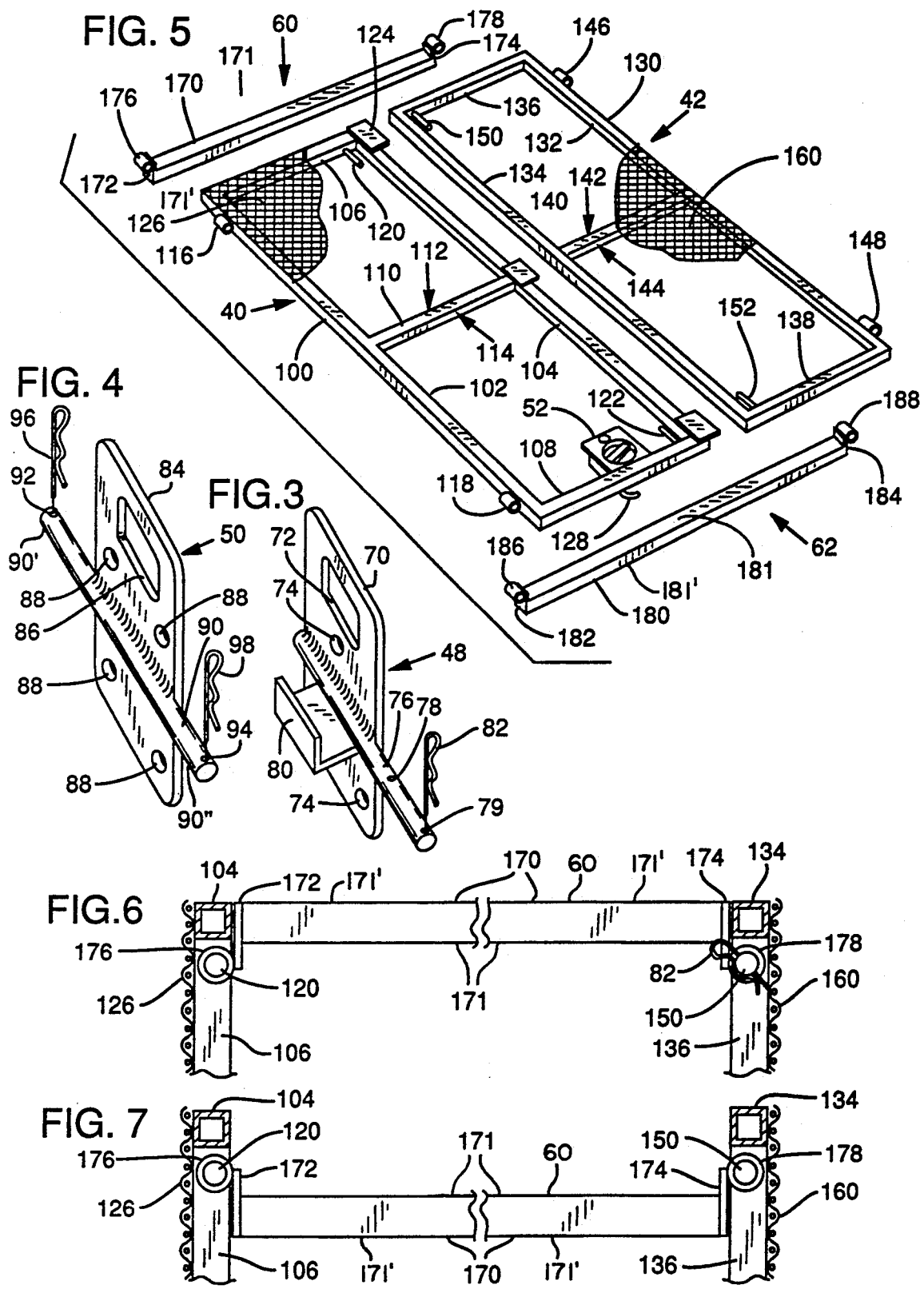

LOAD BEARING COVER AND RACK FOR A PICK-UP TRUCK

TECHNICAL FIELD

This invention relates to a lockable security cover for a pick-up truck bed which provides both a secure storage area within the pick-up truck bed and a flat surface flush with the top of the bed for hauling outsized cargo items and which is convertible into a rack which extends the height of the vertical side walls of the pick-up truck bed to allow transportation of overlength or bulky items.

BACKGROUND OF THE INVENTION

Pick-up trucks are utility vehicles designed to carry cargo in a bed which is incorporated into the vehicle. The bed typically is an open structure having a flat floor, upstanding spaced apart vertical side walls connected to the floor, a front wall interconnecting the floor and the side walls, and a movable rear wall or tailgate. The load carrying capability of the pick-up truck bed is limited by the dimensions of the structure such as width and length of the floor, and the height of the side walls.

Because the pick-up truck bed is a structure open at the top, any equipment or cargo stored or carried in the bed is easily stolen.

A need therefore exists for extending the load carrying capabilities of pick-up truck beds and for providing a lockable cover to secure any equipment or cargo carried in the bed.

SUMMARY OF THE INVENTION

This invention is an accessory for use with the bed of a pick-up truck, utility trailer or other vehicle, comprising a pair of panels pivotally attached to the inside of the side walls of the vehicle bed to allow the panels to rotate from a closed or horizontal position, overlaying the vehicle bed, flush with the top of the vehicle bed, where they function as a load bearing lockable cover, to an open or vertical position where they function as a rack which extends the height of the side walls of the vehicle bed.

A pair of load supports are selectively movable from a first position, transverse the vehicle bed, between the side walls, underlying the panels when the panels are in a closed position to provide a support for any load carried by the panels, to a second position, transverse the vehicle bed, between the panels and attached to the panels when the panels are in the open position to restrain the panels in the open position and to provide a load carrying support on the top thereof for elongated items.

It is an object of the invention to provide a load carrying lockable cover for the bed of a pick-up truck, utility trailer or other load carrying structure.

It is a further object of the invention to provide a rack which extends the vertical height of the side walls of a pick-up truck bed.

Another object of the invention is to provide a rack extending above the top surface of a pick-up truck bed adaptable for carrying elongated items wherein the elongated items are longer than the bed of the pick-up truck.

It is also an object of the invention to provide a cover for a pick-up truck bed wherein the cover is convertible into a rack and wherein the cover may be easily and quickly removed from the bed of the pick-up truck.

Other objects and advantages of the present invention will be apparent from the following description of a preferred embodiment thereof and from the attached drawings.

BRIEF DESCRIPTION OF THE DRAWINGS

FIG. 3 is a perspective view of a front pivot bracket to mount the cover and rack of the present invention to the bed of a pick-up truck bed.

FIG. 4 is a perspective view of a rear pivot bracket to mount the cover and rack of the present invention to the bed of a pick-up truck bed.

FIG. 5 is an expanded, partially broken away perspective view of the cover panels and load support members of the cover and rack of the present invention.

FIG. 6 is a partial sectional view of the cover panels of the present invention in an open position having a load support member installed in an alternate position to that shown in FIG. 2.

FIG. 7 is a partial sectional view along lines 7—7 of FIG. 2.

DETAILED DESCRIPTION OF THE INVENTION

Figure 1:
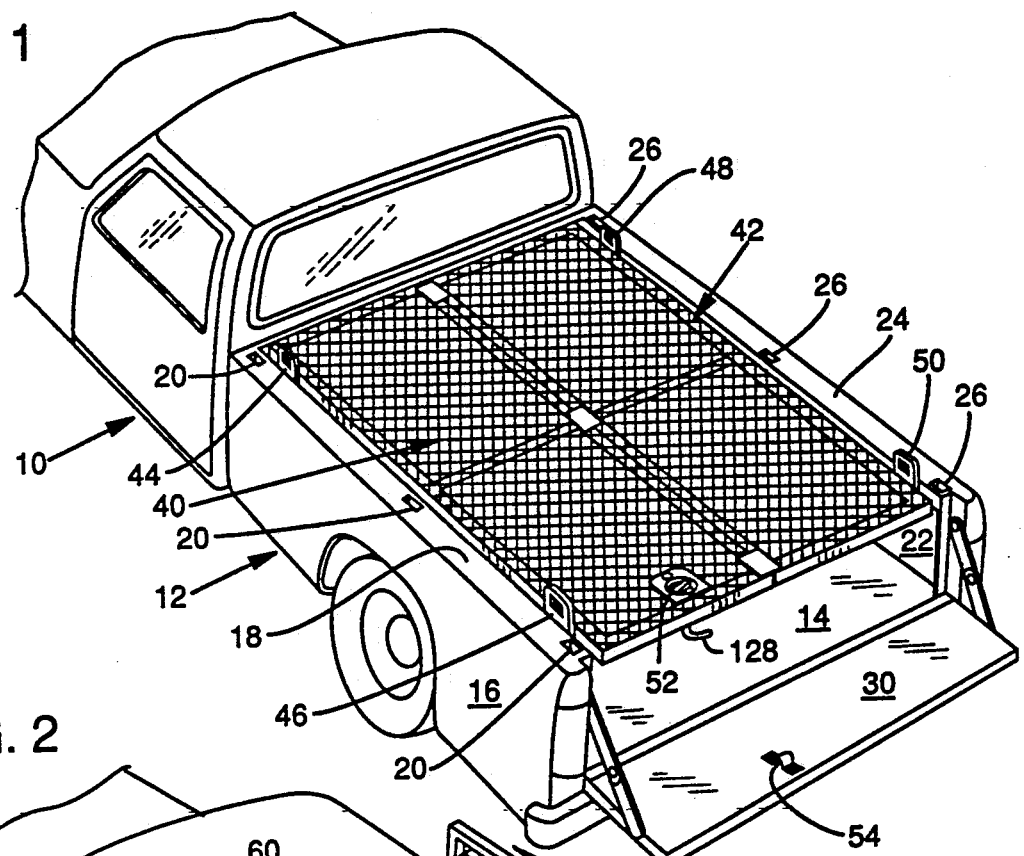
FIG. 1 is a perspective view of a pick-up truck having the cover and rack of the present invention shown in a closed position.
Figure 2:
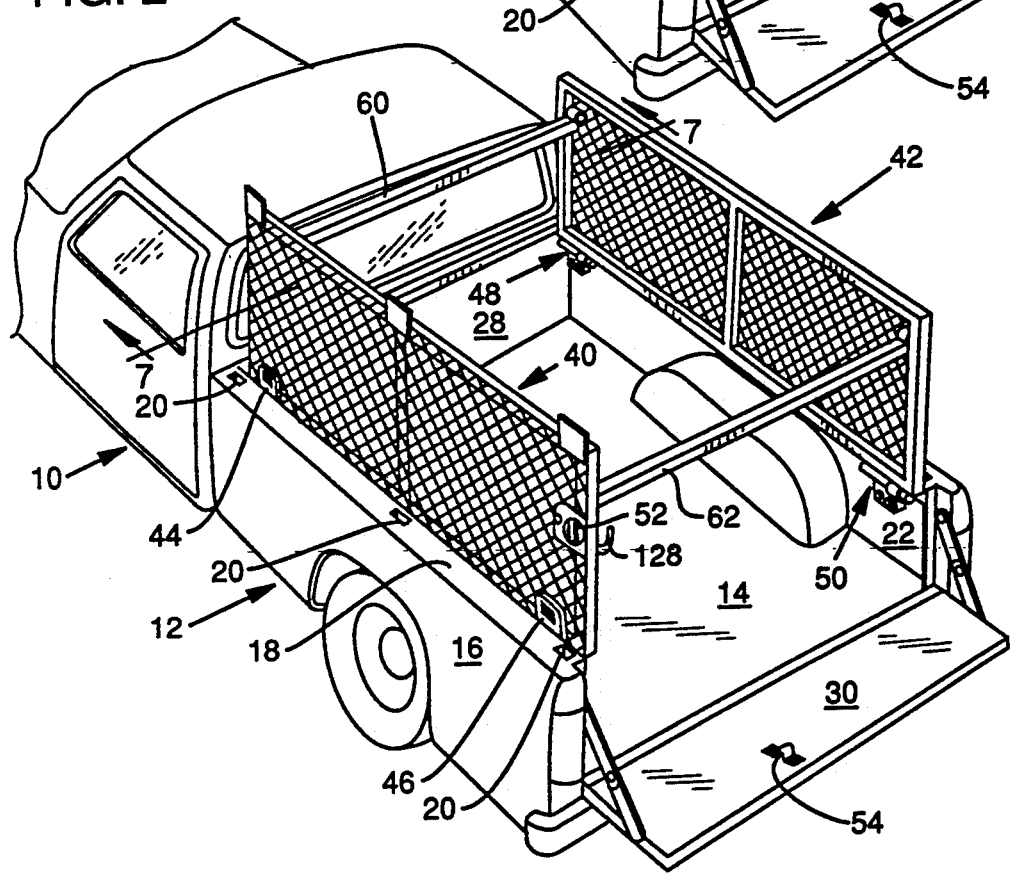
FIG. 2 is a perspective view of a pick-up truck having the cover and rack of the present invention shown in an open position.

Referring now to FIG. 1 and FIG. 2, perspective views of a pick-up truck 10 with a cover and rack of the present invention installed on the pick-up truck bed 12 are shown. It should be noted that although this detailed description is related to the cover and rack of the present invention installed on a pick-up truck bed, the cover and rack is equally adapted for use with a utility trailer or other vehicle having a load carrying bed.

Pick-up truck bed 12 is generally composed of a substantially flat-load carrying floor 14 attached to a first vertical side wall 16. The vertical side wall 16 has a top 18 through which there may be plurality of openings 20 for attaching stakes or other auxiliary racks. A second vertical side wall 22 is spaced apart from the first vertical side wall 16 and connected to the floor 14. Side wall 22 also has a top surface 24 through which a plurality of openings 26 may be incorporated for holding stakes and other auxiliary racks. A front wall 28 interconnects the floor 14 and the two vertical side walls 16 and 22 to form an open load carrying structure. Front wall 28 generally interconnects the inside of the first vertical side wall 16, the inside of the second vertical side wall 22, and the floor 14. A movable rear wall 30 or tailgate is generally provided to form an extension of the load carrying floor 14 when in the lowered position and to interconnect the two vertical side walls 16 and 22 when in the vertical or closed position.

As shown in FIG. 1, two panels 40 and 42 cooperate to form a cover over the bed 12 of the pick-up truck. A first pair of pivot brackets 44 and 46 pivotally attach the first panel 40 to the inside of the first vertical side wall 16. When in the closed position, as shown in FIG. 1, pivot brackets 44 and 46 hold the first panel 40 horizontal, parallel to floor 14 and flush with the top surface 18 of the first side wall 16. A second pair of pivot brackets 48 and 50 pivotally attach the second panel 42 to the inside of the vertical side wall 22. In a closed position, panel 42 is horizontal, parallel to floor 14, and flush with the top surface 24 of the second vertical side wall 22. Pivot bracket 44 is a first forward pivot bracket and is symmetrically opposite to pivot bracket 48 which is the second forward pivot bracket. Pivot bracket 46 is the first rearward pivot bracket and is symmetrically opposite to the second rearward pivot bracket 50. Pivot brackets 44 and 46 form a first pair of pivot brackets for the first panel 40 while pivot brackets 48 and 50 form a second pair of pivot brackets for the second panel 42.

A latch 52 is provided in one or the other of the panels 40 or 42 to engage a hasp 54 mounted on the tailgate 30 for locking the assemblies together as will be explained below.

A pair of load support members 60 and 62, see FIGS. 2 and 5, are selectively engageable to underlie the panels 40 and 42 when the panels are in the closed, horizontal position, parallel to floor 14, as shown in FIG. 1, and to engage the panels 40 and 42 when the panels are in an open or vertical position, perpendicular to floor 14, as shown in FIG. 2, to restrain the panels in the vertical position.

Referring now to FIG. 3, pivot bracket 48 is shown in detail. Pivot bracket 48 includes a plate 70 having an elongated opening 72 near the top thereof and a plurality of holes 74 drilled through the bracket to provide a means to attach the pivot bracket 48 to the inside side wall of the pick-up truck bed.

A pivot pin 76 is welded or suitably attached to the plate 70. Pivot pin 76 has holes 78 and 79 drilled through for accepting a spring clip or other security means as will be explained below. A stop bracket 80 may also be included on the plate 70 to engage the frame of the panel 42 and prevent the panel from being pulled rearward when the panel is in the horizontal or closed position.

Pivot bracket 44 has the same components and features as pivot bracket 48 but is a mirror image thereof and is adapted to attach to the inside of the vertical side wall 16. When installed, pivot bracket 48 is positioned such that the top portion of plate 70 extends above the top surface 24 of the second vertical side wall 22 to place elongated slot 72 above top surface 24. Pivot bracket 44 is attached to the inside of vertical side wall 16 in a similar manner.

Referring now to FIG. 4, pivot bracket 50 comprises a plate 84 having an elongated slot 86 near the top of the plate. A plurality of attachment holes 88 allows the pivot bracket 50 to be mounted to vertical side wall 22 of the pick-up bed by rivets or threaded fasteners, such as sheet metal screws or nuts and bolts. A pivot pin 90 is welded horizontally to plate 84 and extends from each side of the plate as indicated at 90' and 90". A pair of holes 92 and 94 is provided through the pivot pin 90 near its opposite ends to accept a hairpin clip 98, or 96 to restrain the panel 42, as will be explained below. During installation, pivot brackets 46, 50 are attached such that the elongated slot 86 extends above the top surface 24 of the vertical side wall 22. As may be seen in FIGS. 3 and 4, pivot pin 76 extends from the plate 70 about twice the distance that the pin 90 extends from either side of the plate 84.

FIG. 5 shows the first panel 40, the second panel 42, the first load support 60, and the second load support 62 in more detail. Panel 40 is comprised of a framework 100 which consists of longitudinal frame members 102, 104 and transverse frame members 106, 108, and 110.

The frame members are constructed of tubing, preferably rectangular, which can be steel, aluminum, or other suitable material. Frame member 104 forms an inside edge, frame member 102 forms an outside edge, frame member 106 forms a front edge, and frame member 108 forms a rear edge of framework 100. Frame member 110 is an intermediate frame member and is centrally located in the framework 100 or, in an alternate embodiment, a plurality of transverse frame members 110 may be placed between the front transverse frame member 106 and a rear transverse frame member 108. The individual frame members combine to form framework 100 which has a top surface 112 and a bottom surface 114.

The outside of frame member 102 has hollow pivot attachments 116 and 118 securely attached to the outside surface thereof. A pin 120 is attached to the inside of the front transverse cross member 106 and extends rearward toward the rear cross member 108, parallel to and near the inside longitudinal frame member 104. Similarly, a second pin 122 is attached to the inside of the rear frame cross member 108 and extends forward toward the front cross member 106, parallel to and near the longitudinal frame member 104. In one embodiment of the invention, a plurality of flat plates 124 are attached along the length of the top surface 112 of framework 100 on longitudinal frame member 104. Plates 124 extend over the near edge of the panel 42 when the panels are in the closed position, as shown in FIG. 1.

A covering 126 overlies the top surface 112 of the framework 100. Covering 126, in one embodiment of the invention, is expanded mesh metal which is attached to framework 100 by welding, riveting, or other suitable attachment means. In alternate embodiments of the invention, covering 126 may be solid panel of aluminum, steel, fiberglass, or plastic.

In one embodiment of the invention, the latch 52 is attached to the rear frame cross member 108. A pawl 128 of the latch 52 is selectively rotatable to engage hasp 54 shown in FIG. 1.

The second panel 42 has a similar construction to that of panel 40. A framework 130 has an inside longitudinal frame member 134 and an outside longitudinal frame member 132. A front transverse frame member 136 is attached to frame members 132 and 134. A rearward transverse frame member 138 is similarly attached to longitudinal frame members 132 and 134. Intermediate frame member 140, which in the preferred embodiment of the invention is centrally located, is provided to complete the structure of framework 130. Framework 130, has a top surface 142 and a bottom surface 144. Hollow, tubular pivot members 146 and 148 are attached to the outside of longitudinal frame member 132.

A third pin 150 is attached to the inside of transverse cross member 136 and extends rearward toward rear cross member 138, parallel to and near longitudinal frame member 134. A fourth pin 152 is attached to the inside of rear frame member 138 and extends forward toward front frame member 136, parallel to and near the longitudinal frame member 134. A covering 160, similar to covering 126, is provided on the top surface 142 of framework 130.

Front load support 60 has a central member of rectangular tubing 170 having a pair of opposite, parallel, longitudinally extending, horizontal surfaces 171, 171', see FIGS. 5-7. A mounting plate 172 is suitably attached to one end of member 170 and is offset therefrom. A plate 174 is attached to the opposite end thereof and similarly extends above the surface 171. A tubular attachment 176 is welded to the end of the plate 172 and a second tubular attachment 178 is welded to the end of plate 174.

Rear load support member 62 is identical to load support member 60. Load support member 62 has a central tubular member 180, having a plate 182 welded to one end thereof and a plate 184 welded to the opposite end thereof. A tubular attachment 186 is welded to plate 182 while a tubular attachment 188 is welded to plate 184. The surface 181 of the member 180 is flat and horizontal as is the opposite surface 181'.

INSTALLATION AND OPERATION

To begin installation, pivot brackets 48 and 50 are attached by means of suitable fasteners to the inside of vertical side wall 22 such that longitudinal slots 72 and 86 extend above the top surface 24 of vertical side wall 22 and the axis of pin 76 is parallel to floor 14. Similarly, pivot bracket 44 and 46 are attached to the inside of vertical side wall 16 such that the axis of pin 90 is parallel to floor 14. The position and location can be accomplished by suitable templates included in the installation package. Similarly, latch hasp 54 is attached to the tailgate 30.

Panel 42 is then held at an angle to the horizontal and tubular pivot 146 is engaged on pivot pin 76 of the forward bracket 48. Panel 42 then is moved toward the forward wall 28 of the pick-up truck bed and tubular pivot 148 engaged on pivot pin portion 90" of the rear bracket 50. The greater length of the pivot pin 76 facilitates the mounting of the panel 42 because the forward end of the panel is supported on pivot pin 76 while the rearward end is maneuvered to engage pin portion 90" of pin 90 with pivot 148. Spring clip 98 is placed through hole 94 of pivot pin 90 to restrain panel 42 on pivot brackets 46 and 50. Panel 40 is attached to the pivot pins associated with pivot brackets 44 and 46 in a similar manner.

The load support members 60 and 62 are then installed. The first or front load support 60 has its tubular attachment member 178 slid onto the pivot pin 76 of pivot bracket 48. Simultaneously, tubular attachment 176 is engaged with the pivot pin of pivot bracket 44. A spring clip 82 is then inserted through the hole 79 in the pivot pin to restrain the front load support 60 and the panel 42 thereon. A similar spring clip is used with the pivot pin of bracket 44.

The rear load support 62 has its attachment 188 engaged on pivot pin portion 90' (which is pointing towards the front of the truck) of pivot bracket 50 and spring clip 96 is engaged in hole 92 in pin portion 90' to restrain load support 62. Similarly, the rear load support 62 has its attachment 186 engaged on pivot pin portion 90" (which is pointing towards the front of the truck) of pivot bracket 16 and spring clip 98 is engaged in hole 91 in pin portion 90" to restrain load support 62.

Panel 42, in a closed position, has the bottom 144 of framework 130 lying in line-to-line engagement with the top surface 171 of load support 60 and the top surface 181 of load support 62. Panel 40, when in a closed position, similarly has the lower surface 114 of framework 100 in line-to-line contact with surface 171 of load support 60 and surface 181 of load support 62. plates 124 overlay panel 42 along the longitudinal frame member 134. When a tailgate 30 is closed, latch 52 may be rotated such that pawl 128 engages the open portion of hasp 54 and, therefore, locks the tailgate to the panel members. This provides a secure storage area for any equipment or cargo within the pick-up bed 12 without limiting the surface area of the floor 14.

The elongated slots 72 and 86 in the brackets 48 and 50 and the corresponding slots in pivot brackets 44 and 46 which extend above the top surface of bed 12 provide a convenient attachment point for ropes, straps, or other devices to hold cargo on the top surface of panels 40 and 42.

To completely remove the cover and rack, all the spring clips are removed, the load support members removed from the pivot pins, and the panels 40 and 42 are rotated upward slightly from the horizontal to clear bracket 80 and pulled rearward to disengage from the pivot pins.

To convert the closed cover assembly to a rack, the latch 52 is rotated such that pawl 128 comes out of engagement with the hasp 54 located on tailgate 30. Panel 40 is rotated such that it now extends in a vertical position parallel to the inside of vertical side wall 16. Rotation beyond the vertical is prevented by the plate of pivot bracket 44 and the plate of pivot bracket 46 contacting the inside frame member 102. Panel 42 is then rotated upward in a similar manner until longitudinal frame member 132 contacts plate 84 of pivot bracket 50 and plate 70 of pivot bracket 48. Spring clip 82 is removed from hole 79 in pivot pin 76 and the similar spring clip is removed from the pivot pin of bracket 44. The front load support 60 is then removed from pivot pin 76 and the corresponding pivot pin of pivot bracket 44 and the spring clips 82 are reengaged in the pivot pins. Load support member 60 is then engaged such that tubular attachment 178 engages pin 150 and tubular attachment 176 engages pin 120. Similarly, the rear support member 62 is removed from pivot brackets 50 and 46 and engaged on pins 152 and 122. Spring clips (not shown) or other attachment means are used to prevent load supports 60 and 62 from sliding off of their respective mating pins.

Referring to FIG. 2, it can be seen that the panels 40 and 42 when in a vertical or open position and restrained by load supports 60 and 62 from a vertical extension of the inside of the vertical side walls 16 and 22 of pick-up bed 12. It should also be noted that the top surface 18 of vertical side wall 16 and top surface 24 of vertical side wall 22 are unencumbered and any racks or stakes which have been placed in slots 20 or 26 of the bed side walls are not hindered or impeded by the covers when in the vertical position.

Referring now to FIG. 6 and FIG. 7, a further utility can be seen. As shown in FIG. 6, load support 60 may be positioned on pins 120 and 150 such that the surface 171 is toward the floor 14 of the bed of the pick-up truck. The opposite surface 171 of the load support member provides a flat load supporting surface between frame member 104 of panel 40 and frame member 134 of panel 42 flush with the top edges of the panels. A cover (not shown) may easily be placed across the load supports 60 and 62 to enclose or cover the vertical rack assembly.

As shown in FIG. 7, load support 60 may be engaged on pin 120 and pin 150 such that the surface 171 faces upward, away from the bed of the pick-up truck. Because plates 172 and 174 support attached tubular attachments 176 and 178, respectively, in an offset manner, a recess is formed by the load support member 60 between frame member 104 and frame member 134. This provides a convenient carrying area for elongated items, such as tubing, pipe, or lumber, which are longer than the length of the floor 14 of the pick-up bed 12.

Of course, it should be understood that a wide range of changes and modifications can be made to the preferred embodiments described above. It is therefore intended that the foregoing descriptions be regarded illustrative rather than limiting, and that it be understood that it is the following claims, including all equivalents, which are intended to define the scope of the invention.

I claim:

1. A cover for a pick-up truck bed, said cover convertible into a rack, said pick-up truck bed having a fixed floor, a movable tailgate, a pair of fixed spaced apart vertical side walls attached to said floor, each of said side walls having an inside and a top, and a front wall interconnecting said floor and said side walls, said convertible cover comprising:
   a pair of panels;
   attachment means to pivotally attach said pair of panels one to each side of the inside of the side walls of the pick-up bed, said attachment means allowing said panels to pivot from a closed position with a top surface of each of said panels being flush with the top of the side walls to form said cover for the pick-up bed, to a vertical open position parallel with said side walls to form said rack; and
   a pair of transverse load support means selectively moveable from a first position in engagement with said attachment means to underlay said panels when said panels are in the closed position, to a second position in engagement with said panels when said panels are in an open position, to restrain said panels in said open position.

2. A cover for a pick-up truck bed as recited in claim 1 wherein said load support means are engageable in said second position in an upright position to be flush with said panels or in a downward position to form a recess between said panels to form said rack.

3. In a vehicle body including a first upstanding side wall having an inside and a top, a second upstanding side wall, spaced apart from said first side wall, said second side wall having an inside and a top, a front wall, and a rear wall, a cover for the body comprising:
   a first pair of pivot brackets consisting of a first forward pivot bracket attached to the inside of said first side wall near said front wall, and a first rearward pivot bracket attached to the inside of said first side wall near said rear wall;
   a second pair of pivot brackets consisting of a second forward pivot bracket attached to the inside of said second side wall near said front wall, and a second rearward pivot bracket attached to the inside of said second side wall near said rear wall;
   a first cover panel having an upper surface, a lower surface, an inner edge, and an outer edge, said first cover panel releasably attached to said first pair of pivot brackets for rotational movement between an open position upwardly extending from said first side wall to a closed position partially overlaying said receptacle;
   a second cover panel having an upper surface, a lower surface, an inner edge, and an outer edge, said second cover panel releasably attached to said second pair of pivot brackets for rotational movement between an open position upwardly extending from said second side wall to a closed position partially overlaying said receptacle, wherein said upper surface of said first cover panel, when said first cover panel is in the closed position, is flush with the top of said first side wall and said upper surface of said second cover panel, when said second panel is in the closed position, is flush with the top of said second side wall;
   a first transverse load support attached to the first forward pivot bracket and the second forward pivot bracket and underlying said first cover panel and said second cover panel when said first and second cover panels are in the closed position; and
   a second transverse load support attached to the first rearward pivot bracket and the second rearward pivot bracket and underlying said first cover panel and said second cover panel when said first and second cover panels are in the closed position.

4. A load carrying cover and rack for a vehicle bed, said vehicle bed having a floor, a first vertical side wall, a second vertical side wall spaced apart from said first side wall, a vertical front wall, and a movable rear wall, said first and second side walls and said front wall extending upwardly from said floor, said cover and rack comprising:
   a first panel having a top surface, a bottom surface, a front edge, a rear edge, an outside edge, and an inside edge;
   a first pair of pivots attached to the outside edge of said first panel;
   a second panel having a top surface, a bottom surface, a front edge, a rear edge, an outside edge, and an inside edge;
   a second pair of pivots attached to the outside edge of said second panel;
   a first forward pivot bracket attached to the first vertical side wall adjacent the front wall, said first forward pivot bracket including an upstanding plate extending above the first vertical side wall of said vehicle and a pivot pin attached to said first forward pivot bracket and extending rearward parallel to said floor;
   a second forward pivot bracket attached to the second vertical side wall of said vehicle adjacent the front wall, said second forward pivot bracket including an upstanding plate extending above the second vertical side wall of said vehicle and a pivot pin attached to said second forward pivot bracket and extending rearward parallel to said floor;
   a first rearward pivot bracket attached to the first vertical side wall of said vehicle rearward of said first forward pivot bracket, said first rearward pivot bracket including an upstanding plate extending above the first vertical side wall of said vehicle and a pivot pin attached to said first rearward pivot bracket and extending parallel to said floor of said vehicle;
   a second rearward pivot bracket attached to the second vertical side wall of said vehicle rearward of said second forward pivot bracket, said second rearward pivot bracket including an upstanding plate extending above the second vertical side wall of said vehicle and a pivot pin attached to said second rearward pivot bracket and extending parallel to said floor of said vehicle;
   said first pair of pivots rotationally engaging said pivot pin of said first forward pivot bracket and said pivot pin of said first rearward pivot bracket to allow rotation of said first panel about said pivot pins from a position parallel to said floor to a position perpendicular to said floor;

said second pair of pivots rotationally engaging said pivot pin of said second forward pivot bracket and said pivot pin of said second rearward pivot bracket to allow rotation of said second panel from a position parallel to said floor to a position perpendicular to said floor;

a first transverse load support selectively engaging the pivot pin of said first forward pivot bracket and the pivot pin of said second forward pivot bracket; and a second transverse load support selectively engaging the pivot pin of said first rearward pivot pin and the pivot pin of said second rearward pivot bracket, wherein said first transverse load support and said second transverse load support lie beneath the first and second panels to support the panels.

5. A load carrying cover and rack for a vehicle bed, said vehicle bed having a floor, a first vertical side wall, a second vertical side wall spaced apart from said first side wall, a vertical front wall, and a movable rear wall, said first and second side walls and said front wall extending upwardly from said floor, said cover and rack comprising: a first panel having a first framework with a top surface, a bottom surface, a front edge, a rear edge, an outside edge, and an inside edge;

a first covering attached to the top surface of said first framework;

a first pair of tubular pivots attached to the outside edge of said first framework;

a first pin attached to the front edge of said first framework near the inside edge thereof and extending rearward toward the rear edge of said first framework;

a second pin attached to the rear edge of said first framework near the inside edge thereof and extending forward toward the front edge of said first framework;

a second panel having a second framework with a top surface, a bottom surface, a front edge, a rear edge, an outside edge, and an inside edge;

a second covering attached to the top surface of said second framework;

a second pair of tubular pivots attached to the outside edge of said second framework;

a third pin attached to the front edge of said second framework near the inside edge thereof and extending rearward toward the rear edge of said second framework;

a fourth pin attached to the rear edge of said second framework near the inside edge thereof and extending forward toward the front edge of the second framework;

a first pivot bracket attached to the first vertical side wall adjacent the front wall, said first pivot bracket including a first upstanding plate extending above the first vertical side wall of said vehicle and a first pivot pin attached to said first pivot bracket and extending rearward parallel to said floor;

a second pivot bracket attached to the second vertical side wall of said vehicle adjacent the front wall, said second pivot bracket including a second upstanding plate extending above the second vertical side wall of said vehicle and a second pivot pin attached to said second pivot bracket and extending rearward parallel to said floor;

a third pivot bracket attached to the first vertical side wall of said vehicle rearward of said first pivot bracket, said third pivot bracket including a third upstanding plate extending above the first vertical side wall of said vehicle and a third pivot pin attached to said third pivot bracket and extending parallel to said floor of said vehicle;

a fourth pivot bracket attached to the second vertical side wall of said vehicle rearward of said second pivot bracket, said fourth pivot bracket including a fourth upstanding plate extending above the second vertical side wall of said vehicle and a fourth pivot pin attached to said fourth pivot bracket and extending parallel to said floor of said vehicle;

said first pair of tubular pivots rotationally engaging said first pivot pin and said third pivot pin to allow rotation of said first panel about said pivot pins from a position parallel to said floor to partially cover said vehicle bed to a position perpendicular to said floor to extend the first vertical side wall;

said second pair of tubular pivots rotationally engaging said second pivot pin and said fourth pivot pin to allow rotation of said second panel from a position parallel to said floor to partially cover said vehicle bed to a position perpendicular to said floor to extend the second vertical side wall;

a first transverse load support selectively engaging the first pivot pin and the second pivot pin when the first panel and the second panel are in a horizontal position parallel to said floor or engaging the first pin of the first panel and the third pin of the second panel when the first panel and second panel are in a vertical position perpendicular to said floor; and a second transverse load support selectively engaging the third pivot pin and the fourth pivot pin when the first panel and the second panel are in the horizontal position or engaging the second pin of the first panel and the fourth pin of the second panel when the first panel and the second panel are in the vertical position.

6. A load carrying cover and rack as recited in claim 5 wherein said first framework and said second framework are comprised of rectangular tubing.

7. A load carrying cover and rack as recited in claim 5 wherein said first covering and said second covering are comprised of metal mesh material.

8. A load carrying cover and rack as recited in claim 5 wherein said first transverse load support and said second transverse load support are each comprised of rectangular tubing and each has tubular retaining members on ends thereof offset from a surface of said member.

9. A load carrying cover and rack as recited in claim 8 wherein said first transverse load support and said second transverse load support each have a pair of opposite, parallel, longitudinally extending surfaces, and a pair of mounting plates, one plate mounted on each of the opposite ends of the respective load support, said mounting plates having engaging means thereon, for releasibly engaging said pins and said pivot pins, said engaging means being offset from said transverse load supports such that said load supports may be positioned between said panels, when said panels are in said vertical position, with one of said longitudinally extending surfaces facing upwardly and flush with the top edges of said panels, and, alternately, with the other of said longitudinally extending surfaces facing upwardly and positioned beneath the level of said edges to form said rack.

10. A load carrying cover and rack as recited in claim 5 wherein a locking means selectively latches and locks said panels to said bed.

* * * * *

UNITED STATES PATENT AND TRADEMARK OFFICE
CERTIFICATE OF CORRECTION

PATENT NO. : 5,009,457

DATED : April 23, 1991

INVENTOR(S) : David E. Hall

It is certified that error appears in the above-identified patent and that said Letters Patent is hereby corrected as shown below:

Col 4, line 34, "may be solid" should be --may be a solid--

Col 5, line 55, "pivot bracket 16" should be --pivot bracket 46--
line 55, "engaged in hole 91" should be --engaged in hole 94--
line 63, "62. plates 124" should be --62. Plates 124--

Col 6, line 42, "from" should be --form--
line 54, "opposite surface 171" should be --opposite surface 171'--

Signed and Sealed this

Twenty-seventh Day of April, 1993

*Attest:*

MICHAEL K. KIRK

*Attesting Officer*     *Acting Commissioner of Patents and Trademarks*